US008687601B2

(12) United States Patent
Xu et al.

(10) Patent No.: US 8,687,601 B2
(45) Date of Patent: Apr. 1, 2014

(54) METHODS AND APPARATUS TO PERFORM ANTENNA MANAGEMENT

(75) Inventors: Hua Xu, Ottawa (CA); Zhijun Cai, Euless, TX (US); Jun Li, Richardson, TX (US); Mo-Han Fong, Ottawa (CA); Timothy Creasy, Ottawa (CA); Mark Eamshaw, Kanata (CA); Youn Hyoung Heo, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 538 days.

(21) Appl. No.: 12/821,960

(22) Filed: Jun. 23, 2010

(65) Prior Publication Data

US 2011/0149886 A1    Jun. 23, 2011

Related U.S. Application Data

(60) Provisional application No. 61/220,039, filed on Jun. 24, 2009.

(51) Int. Cl.
*H04W 4/00* (2009.01)

(52) U.S. Cl.
USPC ........................................... 370/334; 370/373

(58) Field of Classification Search
USPC .................. 370/349, 310, 330, 334; 375/349, 375/240.05, 240.04, 240.11, 240.24, 240.28
See application file for complete search history.

(56) References Cited

U.S. PATENT DOCUMENTS

| 8,135,359 B2* | 3/2012 | Raaf et al. ...................... 455/101 |
| 8,331,476 B2* | 12/2012 | Jongren ........................ 375/267 |
| 2009/0046805 A1 | 2/2009 | Kim et al. |
| 2009/0060088 A1 | 3/2009 | Callard et al. |
| 2009/0201863 A1* | 8/2009 | Pi .................................. 370/329 |
| 2009/0202016 A1* | 8/2009 | Seong et al. .................. 375/267 |
| 2010/0034314 A1* | 2/2010 | Brown et al. ................. 375/295 |
| 2010/0046651 A1* | 2/2010 | Jongren ........................ 375/260 |
| 2010/0279628 A1* | 11/2010 | Love et al. ...................... 455/70 |
| 2012/0076102 A1* | 3/2012 | Ko et al. ........................ 370/329 |
| 2012/0182956 A1* | 7/2012 | Liu et al. ....................... 370/329 |

FOREIGN PATENT DOCUMENTS

| EP | 1865642 | 12/2007 |
| EP | 2003809 | 12/2008 |
| JP | 2007028569 | 2/2007 |
| JP | 2008312206 | 12/2008 |
| WO | 2008136750 A2 | 11/2008 |
| WO | 2009025510 A1 | 2/2009 |

OTHER PUBLICATIONS

International Bureau, International Preliminary Report on Patentability issued in PCT/US2010/039670, mailed on Jan. 12, 2012, 8 pages.

(Continued)

*Primary Examiner* — Brenda H Pham
(74) *Attorney, Agent, or Firm* — Hanley, Flight & Zimmerman, LLC

(57) ABSTRACT

Methods and apparatus to perform antenna management are described herein. One example method of establishing communication between user equipment and a network includes receiving a control channel message, decoding the control channel message, and sending an indication of whether interoperability of receiving signals from a first number of antennas is certified for the user equipment. Other examples are shown and described.

25 Claims, 7 Drawing Sheets

(56) References Cited

OTHER PUBLICATIONS

International Searching Authority, International Search Report and Written Opinion of the International Searching Authority for International application No. PCT/US2010/039670, Mailing date Aug. 24, 2011, 14 pages.

3GPP Standard, 3rd Generation Partnership Project; Technical Specification Group Radio Access Network; Evolved Universal Terrestrial Radio Access (E-Ultra) Radio Resource Control (RRC); Protocol specification (Release 8), 3GPP Standard, 3GPP TS 36.331, No. V8.5.0, Mar. 1, 2009, pp. 1-193, XP050377648, France.

Motorola, Antenna Configuration Information Element, 3GPP Draft, R2-084204, Aug. 18, 2008, 6 pages, 3GPP TSG-RAN WG2#63, Jeju, Korea.

"LTE; Evelloved Universal Terrestrial Radio Access (E-UTRA) and Evolved Packet Core (EPC); Common Test Environments for User Equipment (UE) Conformance Testing", 3GPP, TS 36.508, Version 8.2.1, Release 8, Jul. 2009, (177 Pages).

"3rd Generation Partnership Project; Technical Specification Group Services and System Aspects; Telecommunication Management; Architecture", 3GPP, TS 32.102, Version 8.2.0, Release 8, Dec. 2008, (45 pages).

European Patent Office, "Examination Report", issued in connection with European patent application No. 10732555.7, dated Dec. 21, 2012, (4 pages).

Korean Intellectual Property Office, "Office Action", issued in connection with Korean Patent Application No. 10-2012-7001813, mailed Apr. 9, 2013 (6 pages).

"Test Plan for LTE Interoperability", CTIA Certification Program, Revision 1.1, Jun. 2012 (70 pages).

"Multivender testing in global Evolved Packet Core Networks", MultiService (MSF) Global LTE Interoperability, Mar. 15-30, 2010 (50 pages).

Japan Patent Offiice, "Notice of Reasons for Rejection" and English Translation, issued in connection with JP patent application No. 2012-517693, mailed Aug. 1, 2013 (7 pages).

"CRC Mask Selection for PBCH", Nokia Siemens Networks, Nokia, Feb. 11-15, 2008 (6 pages).

"Common RS configurations in conjunction with UE-specific RS", Phillips, Ericsson, NXP, May 5-9, 2008 (2 pages).

Korean Intellectual Property Office, "Notice of Allowance", issued in connection with Korean Patent Application No. 10-2012-7001813, mailed Sep. 25, 2013 (3 pages).

Canadian Intellectual Property Office, "Office Action", issued in connection with corresponding Canadian Patent Application No. 2,766,648 on Jan. 9, 2014 (2 pages).

* cited by examiner

US 8,687,601 B2

METHODS AND APPARATUS TO PERFORM ANTENNA MANAGEMENT

CROSS-REFERENCE TO RELATED APPLICATIONS

This patent application claims the benefit of U.S. Provisional Patent Application No. 61/220,039, filed Jun. 24, 2009, the entire content of which is expressly incorporated herein by reference. Management

TECHNICAL FIELD

The example embodiments described below relate generally to data transmission in mobile communication systems and more specifically to methods and apparatus to perform antenna management. In certain examples, the following pertains to methods, devices, and systems for introducing of 4-Tx features that are supported by Long Term Evolution (LTE) release 8.

BACKGROUND

As used herein, the terms "user agent" and "UA" can refer to wireless devices such as mobile telephones, personal digital assistants, handheld or laptop computers, and similar devices or other User Equipment ("UE") that have telecommunications capabilities. In some embodiments, a UA may refer to a mobile, wireless device. The term "UA" may also refer to devices that have similar capabilities but that are not generally transportable, such as desktop computers, set-top boxes, or network nodes.

In traditional wireless telecommunications systems or networks, transmission equipment in a base station transmits signals throughout a geographical region known as a cell. As technology has evolved, more advanced equipment has been introduced that can provide services that were not possible previously. This advanced equipment might include, for example, an evolved universal terrestrial radio access network (E-UTRAN) node B (eNB) rather than a base station or other systems and devices that are more highly evolved than the equipment in a traditional wireless telecommunications system. Such advanced or next generation equipment may be referred to herein as long-term evolution (LTE) equipment, and a packet-based network that uses such equipment can be referred to as an evolved packet system (EPS). Additional improvements to LTE systems/equipment will eventually result in an LTE advanced (LTE-A) system. As used herein, the phrase "base station" will refer to any access device that can provide a UA with access to other components in a telecommunications system.

In release 8 (Rel-8) LTE downlink transmission, the system could choose to support the transmit antenna configurations having one, two, or four antennas (i.e., 1-tx, 2-tx and 4-tx). Several examples are described herein regarding how to introduce Rel-8 4-tx features that are supported by LTE Rel-8.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Abbreviations used in the description

Figure 1:
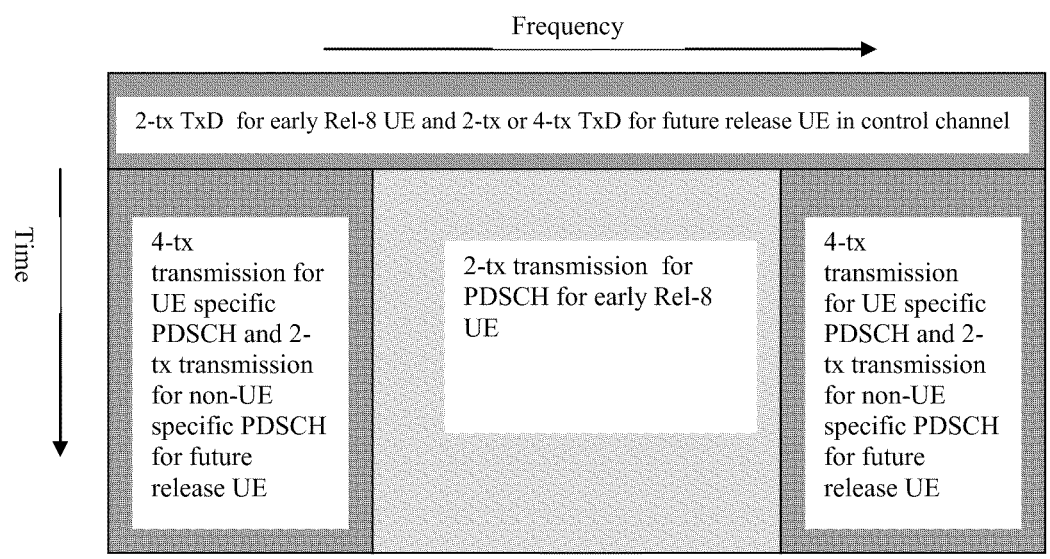
FIG. 1 shows an example of the multiplexing of early Rel-8 UE and future release UE in a 4-tx system in one example embodiment.

| | |
|---|---|
| AOA | Angle of arrival |
| BCCH | Broadcast Control Channel |
| BF | Beamforming |
| CQI | Channel Quality Indicator |
| CCE | Control Channel Element |
| CRS | Common reference signal |
| DL | DownLink |
| DCI | Downlink Control Information |
| DL-SCH | Downlink Shared Channel |
| DRS | Dedicated reference signal |
| DM-RS | Demodulation reference signal |
| eNB | E_UTRAN Node B |
| EoR | ENB or RN |
| EPC | Enhanced Packet Core |
| FDD | Frequency Division Duplexing |
| FRS | Full Resource Scheduling |
| HARQ | Hybrid ARQ (Automatic Repeat Request) |
| L1 Relay | Layer 1 (PHY) relay |
| L2 Relay | Layer 2 (MAC) relay |
| LTE | Long Term Evolution |
| LTE-A | LTE-Advanced |
| MAC | Medium Access Control |
| MCS | Modulation and Coding Scheme |
| MIMO | Multiple Input/Multiple Output |
| MME | Mobility Management Entity |
| MMSE | Minimum Mean Squared Error |
| MU-MIMO | Multiple user MIMO |
| NAS | Non-Access Stratum |
| PCFICH | Physical Control Format Indicator Channel |
| PDCCH | Physical Downlink Control Channel |
| PDSCH | Physical Downlink Shared Channel |
| PHICH | Physical Hybrid ARQ Indicator Channel |
| PUCCH | Physical Uplink Control Channel |
| PUSCH | Physical Uplink Shared CHannel |
| PA | Power Amplifier |
| PMI | Precoding Matrix Index |
| PHY | PHYsical layer |
| PRS | Partial Resource Scheduling |
| PSS | Primary Synchronization Signal |
| RA | Random Access |
| RF | Radio Frequency |
| RLC | Radio Link Control |
| RN | Relay node |
| RNTI | Radio Network Temporary Identifier |
| RAT | Radio Access Technology |
| RI | Rank Indication |
| RN | Relay Node |
| RRC | Radio Resource Control |
| RSRQ | Reference Signal Receive Quality |
| RSRP | Reference Signal Receive Power |
| SFBC + FSTD | Spatial frequency block coding and frequency switch transmit diversity |
| SFN | Single Frequency Network |
| SGW | Serving GateWay |

-continued

| | |
|---|---|
| SRS | Sounding Reference Signal |
| SSS | Secondary Synchronization Signal |
| SU-MIMO | Single user MIMO |
| TA | Timing Alignment |
| TB | Transport Block |
| TDD | Time division duplexing |
| TPMI | Transmitted precoding matrix index |
| TRI | Transmitted rank indicator |
| TTI | Transmission Time Interval |
| UE | User Equipment |
| UL | UpLink |
| Uu | Interface between UE and Relay-Node |
| Un | Interface between Relay-Node and Donor-eNB |
| UL-SCH | Uplink Shared Channel |

In Rel-8 LTE downlink, three antenna configurations could be supported at eNB, which include 1-tx, 2-tx and 4-tx, meaning the use of one, two, and four transmit antennas, respectively. The antenna configuration information at eNB is implicitly signaled to the UE through physical broadcast channel (PBCH) decoding. According to PBCH blind decoding, after a UE synchronizes with the system through synchronization signals, it will try to decode the PBCH by assuming different antenna configurations, and will also need to use different cyclic redundancy check (CRC) masks corresponding to different antenna configurations to verify if the decoding is correct or not. After it succeeds in blind decoding of the PBCH, the antenna configuration is also known to the UE through the association of the CRC and the number of antennas used. The UE will then assume such antenna configurations for the transmission of all common channels such as PDCCH, PHICH etc. Because the antenna configuration at eNB is transmitted implicitly through the PBCH, it is the general understanding that such configuration will not change over time, and the same system cannot support different antenna configurations simultaneously for different UEs, such as supporting 1-tx, 2-tx or 4-tx transmission in the same cell simultaneously.

It was also the general assumption when Rel-8 spec was developed, that all Rel-8 UE shall support all of these transmit antenna configurations since eNB could deploy any one of them. The 4-tx features supported by Rel-8 in downlink mainly include two major functions, transmit diversity (TxD) and spatial multiplexing (SM). TxD is used to maintain the cell-edge performance and will be applied to all the common control channels such as PBCH, PDCCH, PHICH and the PDSCH channel. For TxD, SFBC+FSTD technique is used. For SM function, the main goal is to increase the system throughput. Such function is used in most of the transmission modes defined in Rel-8 such as closed-loop SM transmission mode (mode 4), open-loop SM transmission mode (mode 3) and other relevant modes. For SM, codebook based precoding transmission forms the basis of such function. As common reference signals (CRS), also called cell-specific RS, are used in Rel-8 downlink for demodulation and channel measurement, in a 4-tx system, CRS will be transmitted on all antenna ports.

All Rel-8 UEs should support all possible antenna configurations at eNB, which includes 1-tx, 2-tx and 4-tx transmissions in LTE downlink. The UE would automatically detect the eNB antenna configuration through blindly decoding the PBCH and then assume such antenna configuration throughout its time in that cell. However, during the prioritization planning of test cases in the radio access network (RAN5), it was noted that 4-tx system may not be deployed in early stages of Rel-8. Thus, those test cases related to 4-tx were given medium priority, which means they may not be tested for the terminals for the first release. On the other hand, due to the lack of commercialized 4-tx system in the early deployment, the interoperation test (IOT) between UE and eNB on 4-tx features may not be fulfilled well. That raises the concern that even if all these 4-tx features defined in Rel-8 are implemented by UE, the stability and reliability of such features in real deployment may not be guaranteed. That could make the operators very reluctant to introduce and support 4-tx features for such early Rel-8 UEs. If such a situation happens, that could impose a big setback to LTE system, as many advanced features and significant gains that result from the 4-tx system in Rel-8 will not be realized.

One solution to solve this is to keep the Rel-8 spec as it is right now, but re-evaluate priority for downlink 4-tx test cases in RAN 5 to enable conformance tests for UE for early deployment. At the same time the chip vendors and UE vendors could conduct extensive development tests on 4-tx features to minimize the risks due to the lack of IOT test. During early deployment, if conditions permit, operators could work with terminal vendors for partial IOT test on 4-tx feature. The benefit of such solution is that it has no impact on Rel-8 spec and there will be no backward compatibility problem showing up in the future while operators could enjoy the full benefits of 4-tx features. However the risks of deploying 4-tx features due to lack of IOT could be mitigated but may not be fully avoided.

In a first approach to resolve this issue, an IOT feature group indication for 4-tx feature is defined. For early Rel-8 UE which does not support IOT certified 4-tx features, such indication (for example, a bit) is set to false. For future release of UEs, which support IOT certified 4-tx features, such indication is set to true. The UE would send this indication to the network (e.g., eNB) along with other feature group indication bits after initial call setup or under the control from the eNB.

When 4-tx is introduced in the system, eNB transmits PBCH with 2-tx TxD, even though four transmit antennas are available. This ensures early UEs, which are IOT certified with 2-tx, can continue to receive PBCH correctly. For future release UEs, which support IOT certified 4-tx features, the eNB would need to inform such UEs that the network could support 4-tx transmission. There could be different ways for such signaling.

In one example, eNB always uses 2-tx TxD to transmit PBCH, but instead of using corresponding 2-tx CRC masking, it uses another CRC masking to indicate that eNB could have 4-tx transmission capability. Such CRC masking could be the existing one corresponding to 4-tx CRC masking or a new CRC masking. For this approach, Rel-8 PHY specifications need to be changed to ensure correct PBCH decoding for both early Rel-8 UEs and future release UEs. By this approach, the UE can obtain correctly both the layer mapping information and CRS transmission information. For example, the layer mapping of the PBCH is based on 2-tx TxD, but the CRS is transmitted using 4-tx pattern.

In another example, rather than using a different CRC, the PBCH still uses 2-tx TxD and the corresponding 2-tx CRC masking. The eNB would then need to send a higher layer signal such as radio resource control (RRC) signaling to inform future release UEs that 4-tx transmission is available for PDSCH and possibly PDCCH/PHICH transmission.

For future release UE that supports IOT certified 4-tx features, eNB that supports 4-tx may use different antenna configurations to transmit common control channels other than PBCH. For example, in one implementation, common broadcast or multicast control channels such as PCFICH and common PDCCH will be configured with 2-Tx transmission, Non UE-specific information such as broadcast control information carried on PDSCH is also transmitted using 2-tx configuration; while UE-specific control and data channels such as PHICH/PDCCH and UE-specific PDSCH will be configured using 4-Tx transmission. The CRS transmission is still follow 4-tx transmission pattern which is indicated by the CRC masking. In such embodiment, as 2-tx TxD could be configured for PHICH transmission for early Rel-8 UE while 4-tx TxD could be configured for PHICH transmission for future release UE, there will be mixing of 2-tx and 4-tx PHICH transmission. This requires multiplexing.

Multiplexing could be carried out using at least two different techniques. One way is to group PHICH with the same antenna configuration in the same PHICH group. Such arrangement allows PHICH to use the same TxD scheme as defined in current Rel-8. But as PHICH index and PHICH group index are linked to uplink RB allocation of each UE, such grouping would reduce RB allocation flexibility and multiplexing efficiency in uplink for each UE.

An alternative multiplexing technique allows each PHICH group to contain UEs with different antenna configurations, such as with 2-tx and 4-tx transmission. Such a method would not impose any limitation on uplink RB allocation and all the existing PHICH mapping rules defined in Rel-8 could be used. However, having PHICH with different antenna configuration multiplexing on the same PHICH group would introduce power imbalance across antennas. It could also break orthogonality between different PHICHs and therefore degrade the performance.

In another example, all the common and UE-specific control channel such as PCFICH/PDCCH/PHICH are configured using 2-tx transmission. For PDSCH, it could be configured using 4-Tx for UE-specific transmission while configured using 2-tx transmission for non UE-specific transmission. The CRS transmission is still follow 4-tx transmission pattern which is indicated by the CRC masking. In this example, both PDCCH and PHICH would also use 2-tx TxD, which may lose the coverage gain obtained by using the 4-tx TxD. However, it avoids a number of issues due to the mixing of 2-tx and 4-tx transmissions in the control regions.

In a 4-tx system deployed at a later stage, in order to support those future release UEs, which have the capability of receiving 4-tx features, in one embodiment, 4 common RS ports should be transmitted in both time and frequency as defined in Rel-8. For those early Rel-8 UEs (e.g., UEs that are not IOT certified), even though they are configured with 2-tx transmission, they should be aware of the fact that 4-tx CRS are transmitted, and therefore, should not expect any transmission on those RE allocated for CRS ports 2 and 3.

To convey such information of 4-tx transmission capability of eNB to those early Rel-8 UE, several methods could be used. According to one example, eNB could use 2-tx TxD to transmit PBCH, but use corresponding 4-tx CRC masking for PBCH to indicate that the 4-tx CRS are transmitted. The early Rel-8 UEs should be able to decode such combination and know that even though the system would use 2-tx configuration for its transmission, it would have the 4-tx transmission capability and would transmit on CRS ports 2 and 3.

In another example, the eNB could broadcast or send a high layer signal such as RRC signaling to inform early Rel-8 UEs that it has 4-tx transmission capability and would transmit CRS ports 2 and 3. The UE then should not expect any data transmission on those RE corresponding to CRS ports 2 and 3.

For eNB that supports 4-tx, it uses 2-tx transmit diversity to transmit cell-specific or common control information on PDSCH, e.g. whose corresponding PDCCH are scrambled by SI-RNTI, RA-RNTI, P-RNTI and Temporary C-RNTI. To transmit UE-specific information on PDSCH, e.g. whose corresponding PDCCH are configured by C-RNTI and SPS C-RNTI, the number of antenna ports used is defined by the parameter that is set by RRC signaling. The parameter is initialized based on the minimum value between 2 and the number of antenna ports obtained after PBCH decoding, and can be reconfigured by RRC signaling after eNB obtained the feature group indication information from UE.

In another example, if such RRC signal on antenna port is not configured, the future release UE which supports 4-tx features could assume eNB use 4-tx transmission after it sends to the eNB its feature group indicator, and use corresponding receiver for 4-tx or conduct blind decoding using both receivers for 2-tx and 4-tx at least at the beginning of decoding PDSCH.

Table 1 summarizes in a 4-tx system, different antenna transmission configurations for different channels, for relay Rel-8 UE and future release UE as described in a first approach.

TABLE 1

Antenna configuration for a first approach in a 4-tx system

| UE type | Feature group indicator | PBCH | Common control channel (PCFICH/ PDCCH) and non UE-specific PDSCH (SIB) | UE-specific control channel (PDCCH/ PHICH) | UE-specific PDSCH |
|---|---|---|---|---|---|
| Early Rel-8 UE | False | 2-tx TxD with CRC masking indicating 4-tx system | 2-tx TxD | 2-tx TxD | 2-tx transmission (TxD and SM) |
| Future release UE | True | | 2-tx TxD | 2-tx TxD or 4-tx TxD | 4-tx transmission (TxD and SM) |

The foregoing has described different aspects of this approach and proposed different examples regarding use of this approach to introduce Rel-8 4-tx features without incurring substantial changes to the current specifications and/or standards. In general, the approach proposed here would not require any priority change in RAN 5 on-terminal conformance test for early Rel-8 UE. It would also avoid the risk due to the lack of IOT test 4-tx features.

For eNB deployed in a later stage with 4-tx antennas, as it needs to support both early Rel-8 UEs and future release UEs with different antenna configurations, the implementation at eNB could certainly be complicated.

In the future deployment, when 4-tx systems are deployed, supporting both early Rel-8 UE and future release of UE needs to multiplex them in the same system. FIG. 1 shows such multiplexing as an example.

Modifications on Rel-8 Specifications

Following are examples of modifications based on current Rel-8 specifications to support the examples described above. For simplicity of illustration, only one of the examples is described.

The changes are summarized in the following:
RRC signaling specifications
Definition of an IE that will indicate whether 4-tx antenna configurations are used by the eNB. This IE is sent through dedicated RRC signalling to a particular UE.
Definition of a new parameter sent by eNB to indicate the number of TX antennas used for UE-specific transmissions and procedure text to describe the initialization and reconfiguration of the parameter PHY layer specifications Limit the layer mapping for PBCH/PCFICH/PDCCH/PHICH to 2 TxD Limit the layer mapping for a PDSCH that is pointed by a PDCCH that is scrambled by SI-RNTI, P-RNTI, RA-RNTI and temporary C-RNTI to 2 TxD. Set the layer mapping for a PDSCH that is pointed by a PDCCH that is scrambled by C-RNTI based on the parameter set configured on RRC signalling described above.

A number of modifications are needed in TS 36.331.

Definition and IE change: AntennaInfoDedicated.

A new IE "Antenna4TxIndicator" is defined and added into the existing IE "AntennaInfoDedicated".

The current IE "AntennaInfoDedicated" in the existing Rel 8 RRC specification (3GPP TS 36.331) is defined as follows:

```
AntennainfoDedicated ::=        SEQUENCE {
    transmissionMode                ENUMERATED {
                                        tm1, tm2, tm3, tm4, tm5, tm6,
                                        tm7, spare1},
    codebookSubsetRestriction       CHOICE {
        n2TxAntenna-tm3                 BIT STRING (SIZE (2)),
        n4TxAntenna-tm3                 BIT STRING (SIZE (4)),
        n2TxAntenna-tm4                 BIT STRING (SIZE (6)),
        n4TxAntenna-tm4                 BIT STRING (SIZE (64))
        n2TxAntenna-tm5                 BIT STRING (SIZE (4)),
        n4TxAntenna-tm5                 BIT STRING (SIZE (16)),
        n2TxAntenna-tm6                 BIT STRING (SIZE (4)),
        n4TxAntenna-tm6                 BIT STRING (SIZE (16))
    }                               OPTIONAL,            —Cond
TM
    ue-TransmitAntennaSelection     CHOICE{
        release                         NULL,
        setup                           ENUMERATED
    }                                   {closedLoop, openLoop}
}
```

The new IE "AntennaInfoDedicated" is as follows:

—Start of Text Proposal—

```
AntennaInfoDetheated ::=        SEQUENCE {
    antenna4TxIndicator             BOOLEAN,
    transmissionMode                ENUMERATED {
                                        tm1, tm2, tm3, tm4, tm5, tm6,
                                        tm7, spare1},
    codebookSubsetRestriction       CHOICE {
        n2TxAntenna-tm3                 BIT STRING (SIZE (2)),
        n4TxAntenna-tm3                 BIT STRING (SIZE (4)),
        n2TxAntenna-tm4                 BIT STRING (SIZE (6)),
        n4TxAntenna-tm4                 BIT STRING (SIZE (64)),
        n2TxAntenna-tm5                 BIT STRING (SIZE (4)),
        n4TxAntenna-tm5                 BIT STRING (SIZE (16)),
        n2TxAntenna-tm6                 BIT STRING (SIZE (4)),
        n4TxAntenna-tm6                 BIT STRING (SIZE (16))
    }                               OPTIONAL,            —Cond
TM
    ue-TransmitAntennaSelection     CHOICE{
        release                         NULL,
        setup                           ENUMERATED
    }                                   {closedLoop, openLoop}
}
```

| AntennaInfo field descriptions |
|---|
| antennaPortsCount<br>Parameter represents the number of cell specific antenna ports where an1 corresponds to 1, an2 to 2 antenna ports etc. see TS 36.211, 6.2.1. |
| Antenna4TxIndicator:<br>Indicates whether 4Tx antenna is used on PDSCH for UE specific transmission |
| transmissionMode<br>Points to one of Transmission modes defined in TS 36.213, 7.1 where tm1 refers to transmission mode 1, tm2 to transmission mode 2 etc.<br>codebookSubsetRestriction<br>Parameter: codebookSubsetRestriction, see TS 36.213 [23, 7.2] and TS 36.211 [21, 6.3.4.2.3].<br>ue-TransmitAntennaSelection<br>For value setup the field indicates whether UE transmit antenna selection control is closed-loop or open-loop as described in TS 36.213 [23, 8.7]. |

| Conditional presence | Explanation |
|---|---|
| TM | The field is mandatory present if the transmissionMode is set to tm3, tm4, tm5 or tm6. Otherwise the IE is not present and the UE shall delete any existing value for this field. |

—End of Text Proposal—

The IE "AntennaInfoDedicated" is contained in the IE "PhysicalConfigDedicated", while the IE "PhysicalConfigDedicated" is further contained in the IE "RadioResourceConfigDedicated".

The IE AntennaInfoDedicated is used to specify the UE specific antenna configuration.

The IE PhysicalConfigDedicated is used to specify the UE specific physical channel configuration.

The IE RadioResourceConfigDedicated is used to setup/modify/release RBs, to modify the MAC main configuration, to modify the SPS configuration and to modify dedicated physical configuration.

The IE RadioResourceConfigDedicated is further contained in the RRC message "RRCConnectionReconfiguration", "RRCConnectionReestablishment", "RRCConnectionSetup" and will deliver to the UEs via the dedicated signaling.

Before the UE receives the "AntennaInfoDedicated", for example, for the message 2 and message 4 receptions, both the eNB and the UE should assume the same antenna configurations detected via the PBCH is applied for PDCCH/PHICH/PCIFCH/PDSCH.

Procedure text change

Define the initialization of the new parameter antennaPortDedicated

—Start of Text Proposal—

If the antenna port count determined by the PBCH decoding is greater or equal than 2, then UE set the value of antennaPortDedicated to be 2, otherwise UE set the value of antennaPortDedicated to be 1

—End of Text Proposal—

Define the reconfiguration of antennaPortDedicated.

—Start of Text Proposal—

5.3.10.6 Physical Channel Reconfiguration

The UE shall:

1>reconfigure the physical channel configuration in accordance with the received physicalConfigDedicated;
1>if the antennaInformation is included and set to 'explicit Value':
   if the configured transmissionMode is not 'tm3' or 'tm4' release ri-ConfigIndex in cqi-ReportPeriodic, if previously configured;

-continued

2> if the antenna4TxIndicator is set to "TRUE", the UE shall set antennaPortDedicated to 4;
1>else if the antennaInformation is included and set to 'default Value':
2>release ri-ConfigIndex in cqi-ReportPeriodic, if previously configured;

—End of Text Proposal—
Modification to TS 36.211

The modification could be done in TS 36.211 to limit up to 2-tx transmission for PBCH/PCFICH/PHICH/PDCCH.

—Start of Text Proposal—
6.6.3 Layer Mapping and Precoding

The block of modulation symbols $d(0), \ldots, d(M_{symb}-1)$ shall be mapped to layers according to one of Sections 6.3.3.1 or 6.3.3.3 with $M_{symb}^{(0)}=M_{symb}$ and precoded according to one of Sections 6.3.4.1 or 6.3.4.3, resulting in a block of vectors $y(i)=[y^{(0)}(i) \ldots y^{(P-1)}(i)]^T$, $i=0, \ldots, M_{symb}-1$, where $y^{(p)}(i)$ represents the signal for antenna port p and where p=0, min(P,2)-1 and the number of antenna ports for cell-specific reference signals $P \in \{1,2,4\}$.

—End of Text Proposal—
Modification to 36.212

If it is desired to have a separate PBCH CRC masking to specify that 2-TxD is used for PBCH while eNB could still support 4-tx transmission, then the following modification could be made to 36.212.

—Start of Text Proposal—
5.3.1.1 Transport Block CRC Attachment

Error detection is provided on BCH transport blocks through a Cyclic Redundancy Check (CRC).

The entire transport block is used to calculate the CRC parity bits. Denote the bits in a transport block delivered to layer 1 by $a_0, a_1, a_2, a_3, \ldots, a_{A-1}$, and the parity bits by $p_0, p_1, p_2, p_3, \ldots, p_{L-1}$. A is the size of the transport block and set to 24 bits and L is the number of parity bits. The lowest order information bit $a_o$ is mapped to the most significant bit of the transport block as defined in Section 6.1.1 of 3GPP TS 36.213.

The parity bits are computed and attached to the BCH transport block according to subclause 5.1.1 setting L to 16 bits. After the attachment, the CRC bits are scrambled according to the eNode-B transmit antenna configuration with the sequence $x_{ant,0}, x_{ant,1}, \ldots, x_{ant,15}$ as indicated in Table 5.3.1.1-1 to form the sequence of bits $c_0, c_1, c_2, c_3, \ldots, c_{K-1}$ where $c_k = a_k$ for $k=0,1,2,\ldots,A-1$ $c_k = (p_{k-A} + x_{ant,k-A}) \bmod 2$ for $k=A, A+1, A+2, \ldots, A+15$.

TABLE 5.3.1.1-1

CRC mask for PBCH

| Number of transmit antenna ports at eNode-B | TxD order for non-UE specific transmissions | PBCH CRC mask $\langle x_{ant,0}, x_{ant,1}, \ldots, x_{ant,15} \rangle$ |
|---|---|---|
| 1 | 1 | <0, 0, 0, 0, 0, 0, 0, 0, 0, 0, 0, 0, 0, 0, 0, 0> |
| 2 | 2 | <1, 1, 1, 1, 1, 1, 1, 1, 1, 1, 1, 1, 1, 1, 1, 1> |
| 4 | 2 | <1, 0, 1, 0, 1, 0, 1, 0, 1, 0, 1, 0, 1, 0, 1, 0> |
| 4 | 4 | <0, 1, 0, 1, 0, 1, 0, 1, 0, 1, 0, 1, 0, 1, 0, 1> |

—End of Text Proposal—
Modification to 36.213

In 36.213, antennaPortDedicated can be used to specify antenna configuration of PDSCH for UE.

—Start of Text Proposal—
7.1.2 Transmit Diversity Scheme

For the transmit diversity transmission scheme of the PDSCH, the UE may assume that an eNB transmission on the PDSCH would be performed according to Section 6.3.4.3 of 3GPP TS 36.331, version 8.6.0, which is available on 3GPP website. For PDSCH that are configured by SI-RNTI, P-RNTI, RA-RNTI, and Temporary C-RNTI, 2 antenna ports are used for transmit diversity. For PDSCH that are configured by C-RNTI and SPS C-RNTI, the number of antenna ports that are used is provided by antennaPortDedicated —End of Text Proposal—

In another alternative approach, an IOT feature group indication for 4-tx feature is defined. For early Rel-8 UEs, which do not support IOT certified 4-tx features on PDSCH, such an indication (for example, a bit) is set to false. For future release of UE which supports IOT certified 4-tx features on PDSCH, such indication is set to true. The UE would send this indication to eNB along with other feature group indication bits after initiation.

For eNB that supports 4-tx, it configures 4-tx TxD transmission for common control channels such as PBCH, PCFICH, PDCCH, PHICH. eNB uses 4-tx CRC masks on PBCH. For both early Rel-8 UE and future release UE, UEs can detect the antenna configuration by decoding PBCH. 4-tx common RS ports are transmitted in both time and frequency. After early Rel-8 UEs detect the 4-tx antenna configuration through decoding of PBCH, they should not expect any PDCCH/PDSCH transmission in those RE designated for CRS ports 2 and 3.

For early Rel-8 UE, it could support 2-tx transmission on its PDSCH channel including both 2-tx TxD and 2-tx SM, or it could support 4-tx TxD for PDSCH and 2-tx SM for PDSCH. Such UE could further receive a high-layer signaling from eNB to inform that it should expect to receive 2-tx transmission on its PDSCH channel including 2-tx TxD and 2-tx SM. Or it should expect to receive 4-tx TxD or 2-tx SM on its PDSCH channel.

In one example, for eNB that supports 4-tx, it uses 4-tx transmit diversity to transmit non UE-specific information on PDSCH, e.g. whose corresponding PDCCH are configured by SI-RNTI, RA-RNTI, P-RNTI and Temporary C-RNTI. To transmit UE-specific information on PDSCH, e.g. whose corresponding PDCCH are configured by C-RNTI and SPS C-RNTI, the number of antenna ports used is defined by the parameter that is set by RRC signaling. The parameter is initialized based on the minimum value between 2 and the number of antenna ports obtained after PBCH decoding, and can be reconfigured by RRC signaling after eNB obtained the feature group indication information from UE.

For future release UEs, which supports IOT certified 4-tx features, the eNB would configure 4-tx transmission for both common control channel and PDSCH channels, which includes 4-tx TxD for all common control channels and 4-Tx TxD and SM for PDSCH channels.

Table 2 summarizes in a 4-tx system, different antenna transmission configurations for different channels, for relay Rel-8 UE and future release UE in an alternative approach.

TABLE 2

Antenna configuration for Alternative approach in a 4-tx system

| UE type | Feature group indicator | PBCH | Control channel (PCFICH/ PDCCH/ PHICH) | Non UE-specific PDSCH | UE-specific PDSCH |
|---|---|---|---|---|---|
| Early Rel-8 UE | False | 4-tx TxD with 4-tx CRC masking | 4-tx TxD | 4-tx TxD | 2-tx or 4-tx TxD and 2-tx SM |
| Future release UE | True | | 4-tx TxD | 4-tx TxD | 4-tx transmission (TxD and SM) |

This alternative approach may require elevation of priority of 4-tx TxD for common control channel and PDSCH from medium to high in RAN 5 terminal conformance test, but keep the priority for the remaining 4-tx features unchanged. The aspects of these alternatives could be summarized as follows:

As SFBC+FSTD is used as 4-tx TxD, the same Alamouti decoder could be used at the UE. That means if the 2-tx TxD passes the IOT test, the risk of supporting 4-tx TxD is very small from UE perspective.

To support 4-tx TxD may require channel estimation on CRS ports 2 and 3. If similar channel estimation methodology used on CRS ports 0 and 1 could be applied to CRS ports 2 and 3, the de-risking effort should also be very small.

Supporting 4-tx TxD for common control channel for early Rel-8 UE would guarantee the same coverage of control channel for both early Rel-8 UE and future release UE. It also avoids having to support a mix of antenna configurations in PDCCH and PHICH channels, which may have some multiplexing issue.

Figure 2:
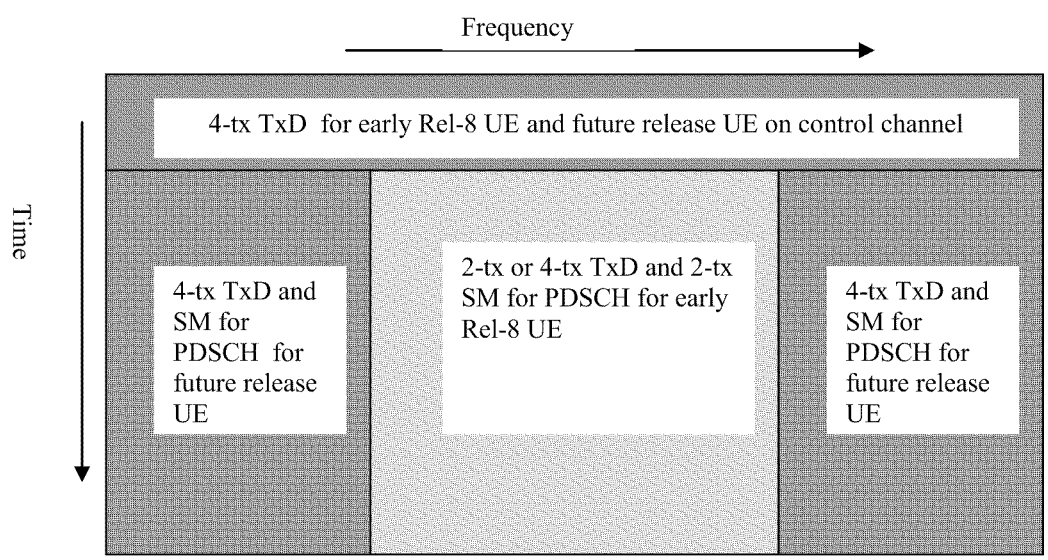
FIG. 2 shows an example of the multiplexing of early Rel-8 UE and future release UE in a 4-tx system in another example embodiment.

In the future when 4-tx system are deployed, supporting both such early Rel-8 UE and future release of UE needs to multiplex them in the same system. FIG. 2 shows such multiplexing as an example.

Modifications on Rel-8 specifications

Followings are the examples of modifications based on current Rel-8 specifications to support this approach. For simplicity of illustration, only one of the examples is described.

The changes are summarized in the following:

RRC signalling specifications

Definition of an IE that will indicate number of Tx Antenna configuration used for UE specific PDSCH transmission Definition of a new parameter to indicate the number of TX antenna used for UE-specific transmissions and procedure text to describe the initialization and reconfiguration of the parameter PHY layer specifications Limit the layer mapping for PDSCH that is configured by SI-RNTI, P-RNTI, RA-RNTI and temporary C-RNTI to 4-tx TxD. Set the layer mapping for PDSCH that is configured by C-RNTI based on the parameter set based on RRC signalling described above.

Modification to TS 36.331

1. A New IE Definition

A new IE "AntennaPDSCHIndicator" is defined and added into the existing IE "AntennaInfoDedicated".

The new IE "AntennaInfoDedicated" is as follows:
—Start of Text Proposal—

```
AntennaInfoDedicated ::=          SEQUENCE {
   antennaPDSCHIndicator             ENUMERATED {an1, an2, an4,
                                         spare},
   transmissionMode                  ENUMERATED {
                                         tm1, tm2, tm3, tm4, tm5, tm6,
                                         tm7, spare1},
   codebookSubsetRestriction         CHOICE {
      n2TxAntenna-tm3                   BIT STRING (SIZE (2)),
      n4TxAntenna-tm3                   BIT STRING (SIZE (4)),
      n2TxAntenna-tm4                   BIT STRING (SIZE (6)),
      n4TxAntenna-tm4                   BIT STRING (SIZE (64)),
      n2TxAntenna-tm5                   BIT STRING (SIZE (4)),
      n4TxAntenna-tm5                   BIT STRING (SIZE (16)),
      n2TxAntenna-tm6                   BIT STRING (SIZE (4)),
      n4TxAntenna-tm6                   BIT STRING (SIZE (16))
   }    OPTIONAL,                                          — Cond
TM
   ue-TransmitAntennaSelection       CHOICE
      release                           NULL,
      setup                             ENUMERATED
   }                                    {closedLoop, openLoop}
}
```

| AntennaInfo field descriptions |
|---|
| antennaPortsCount |
| Parameter represents the number of cell specific antenna ports where an1 corresponds to 1, an2 to 2 antenna ports etc. see TS 36.211, 6.2.1. |
| AntennaPDSCHIndicator: |
| Indicates number of antenna is used on the PDSCH for UE specific transmission where an1 corresponds to 1, an2 to 2 antenna ports etc. |
| transmissionMode |
| Points to one of Transmission modes defined in TS 36.213, 7.1 where tm1 refers to transmission mode 1, tm2 to transmission mode 2 etc. |
| codebookSubsetRestriction |
| Parameter: codebookSubsetRestriction, see TS 36.213 [23, 7.2] and TS 36.211 [21, 6.3.4.2.3]. |
| ue-TransmitAntennaSelection |
| For value setup the field indicates whether UE transmit antenna selection control is closed-loop or open-loop as described in TS 36.213 [23, 8.7]. |

| Conditional presence | Explanation |
|---|---|
| TM | The field is mandatory present if the transmissionMode is set to tm3, tm4, tm5 or tm6. Otherwise the IE is not present and the UE shall delete any existing value for this field. |

—End of Text Proposal—

Before the UE receives the "AntennaInfoDedicated", for example, for the message 2 and message 4 receptions, both the eNB and the UE should assume the same antenna configurations detected via the PBCH is applied for PDCCH/PHICH/PDSCH.

2. Procedure Text Change

A new parameter antennaPortDedicated and related initialization/reconfiguration are defined.

The value of antennaPortDedicated should be initialized to the antenna port count determined by the PBCH decoding.

Define the initialization of the new parameter antennaPortDedicated

—Start of Text Proposal—

If the antenna port count determined by the PBCH decoding is greater or equal than 2, then UE sets the value of antennaPortDedicated to be 2, otherwise UE sets the value of antennaPortDedicated to be 1.
—End of Text Proposal—
Define the reconfiguration of antennaPortDedicated.
—Start of Text Proposal—
5.3.10.6 Physical Channel Reconfiguration
The UE shall:

---

1>reconfigure the physical channel configuration
in accordance with the received
    physicalConfigDedicated;
1>if the antennaInformation is included and set to 'explicitValue':
    if the configured transmissionMode is not 'tm3'
    or 'tm4' release ri-ConfigIndex in cqi-
        ReportPeriodic, if previously configured;
    2>  set antennaPortDedicated to antennaPDSCHDedicated;
1>else if the antennaInformation is included and set to 'defaultValue':
    2>release ri-ConfigIndex in cqi-ReportPeriodic,
    if previously configured;

---

—End of Text Proposal—
Modification to TS 36.213
1. Using antennaPortDedicated to specify antenna configuration of PDSCH TxD for UE specific transmission in TS 36.213
—Start of Text Proposal—
7.1.2 Transmit Diversity Scheme
For the transmit diversity transmission scheme of the PDSCH, the UE may assume that an eNB transmission on the PDSCH would be performed according to Section 6.3.4.3 of [3]. For PDSCH that are configured by SI-RNTI, P-RNTI, RA-RNTI, and Temporary C-RNTI, 4 antenna ports are used for transmit diversity. For PDSCH that are configured by C-RNTI and SPS C-RNTI, the number of antenna ports that are used is provided by antennaPortDedicated
—End of Text Proposal—

Figure 3:
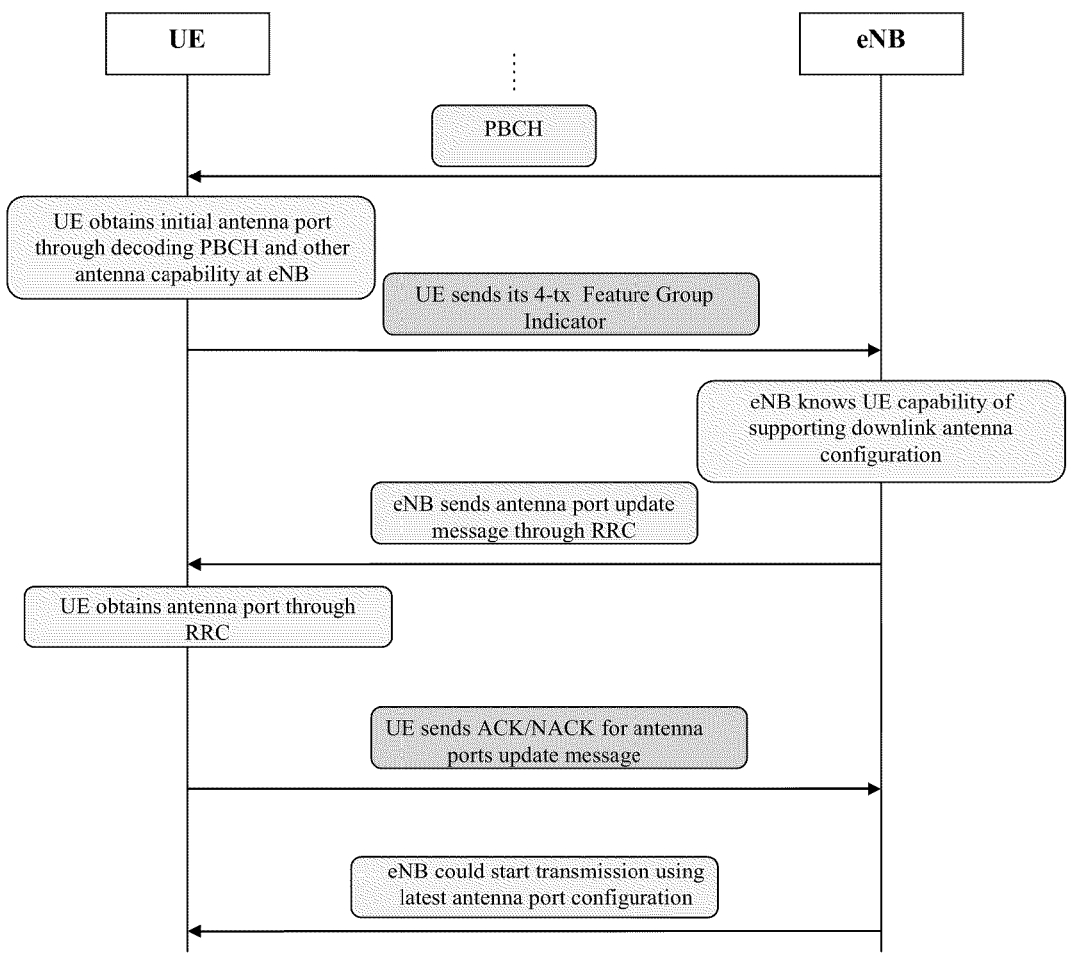
FIG. 3 shows an example of the procedure of hand shaking between UE and a network regarding antenna ports.

As shown in FIG. 3, as an example, the general procedure for UE to obtain downlink transmit antenna configuration from eNB could be as follows The UE could obtain initial antenna ports of eNB through decoding PBCH, such information could be used to receive common control channels and some non UE-specific PDSCH channel.

Through blind decoding of PBCH with the corresponding CRC masking, the UE could also obtain some information on eNB transmission antenna capability such as whether it could support 4-tx transmission. Such information could be used to determine if CRS ports 2 and 3 are transmitted, and therefore, UE should not expect any data transmission on those RE designated to CRS ports 2 and 3.

The UE then sends its feature group indication bits to eNB, which includes the bit for 4-tx features. This bit represents whether the UE is 4-tx IOT certified.

By receiving the feature group indication bits, eNB would know the capability of the UE in supporting full or partial IOT certified Rel-8 4-tx features from corresponding 4-tx feature group indicator. For example, in the first approach described above, if received 4-tx feature group indicator is false, it would mean that the UE is not capable of supporting any IOT certified 4-tx features. However, if received such bit is false in the second approach, the UE should be considered capable of supporting partial 4-tx features such as 4-tx TxD.

The eNB could also send antenna port information to the UE through dedicated high layer signal such as RRC. Such information could be used to update the initial antenna port the UE obtained from PBCH.

The eNB could start transmission to the UE using specified antenna port on some channels.

A summary of the approaches discussed above have been summarized in Table 3.

TABLE 3

Summary of different approaches to introduce 4-tx features for Rel-8

| Approach | Descriptions | Advantages |
|---|---|---|
| 1 | In a 4-tx system, PBCH would use 2-tx TxD transmission so that the early Rel-8 UE would obtain antenna configuration by decoding PBCH. Early Rel-8 UE and future release UE could obtain eNB capability of 4-tx transmission through PBCH masking or broadcasting or high-layer signaling. Supporting 2-tx transmission for early Rel-8 UE for both control and PDSCH channels. For future release UEs, supporting 2-tx or 4-tx transmission for its control channels; supporting 2-tx TxD for non UE-specific transmission on PDSCH, while supporting 4-tx transmission for UE-specific transmission on PDSCH All common RS for ports 0-3 should be transmitted, Early Rel-8 UE.should be aware of this through CRC masking of PBCH or high-layer signaling and therefore not expect any transmission on those RE designated to CRS ports 2 and 3 | No risk due to the lack of IOT for 4-tx features. The early Rel-8 UE could still obtain antenna configuration by decoding PBCH Spec change is small |
| 2 | In a 4-tx system, PBCH would use 4-tx TxD transmission. Early Rel-8 UE and future release UE would both obtain antenna configuration by decoding PBCH | It will maintain the same control channel coverage for all UE Early Rel-8 UE could still obtain antenna configuration for control channel from decoding PBCH |

TABLE 3-continued

Summary of different approaches to introduce 4-tx features for Rel-8

| Approach | Descriptions | Advantages |
|---|---|---|
| | Supporting 4-tx TxD on all control channels for both early Rel-8 UE and future release UE. For early Rel-8 UE, supporting 2-tx or 4-tx TxD and 2-tx SM on PDSCH. For future release UE, supporting 4-tx transmission on PDSCH All common RS for ports 0-3 are transmitted. Early Rel-8 UE.should be aware of this through decoding PBCH and therefore not expect any transmission on those RE designated to CRS ports 2 and 3. For early Rel-8 UE, its non UE-specific transmission on PBSCH could use 2-tx or 4-tx TxD and such configurations could be accomplished by high-layer signaling. | No mixed supporting of different antenna configuration in control region. Spec change is small |

Figure 4:
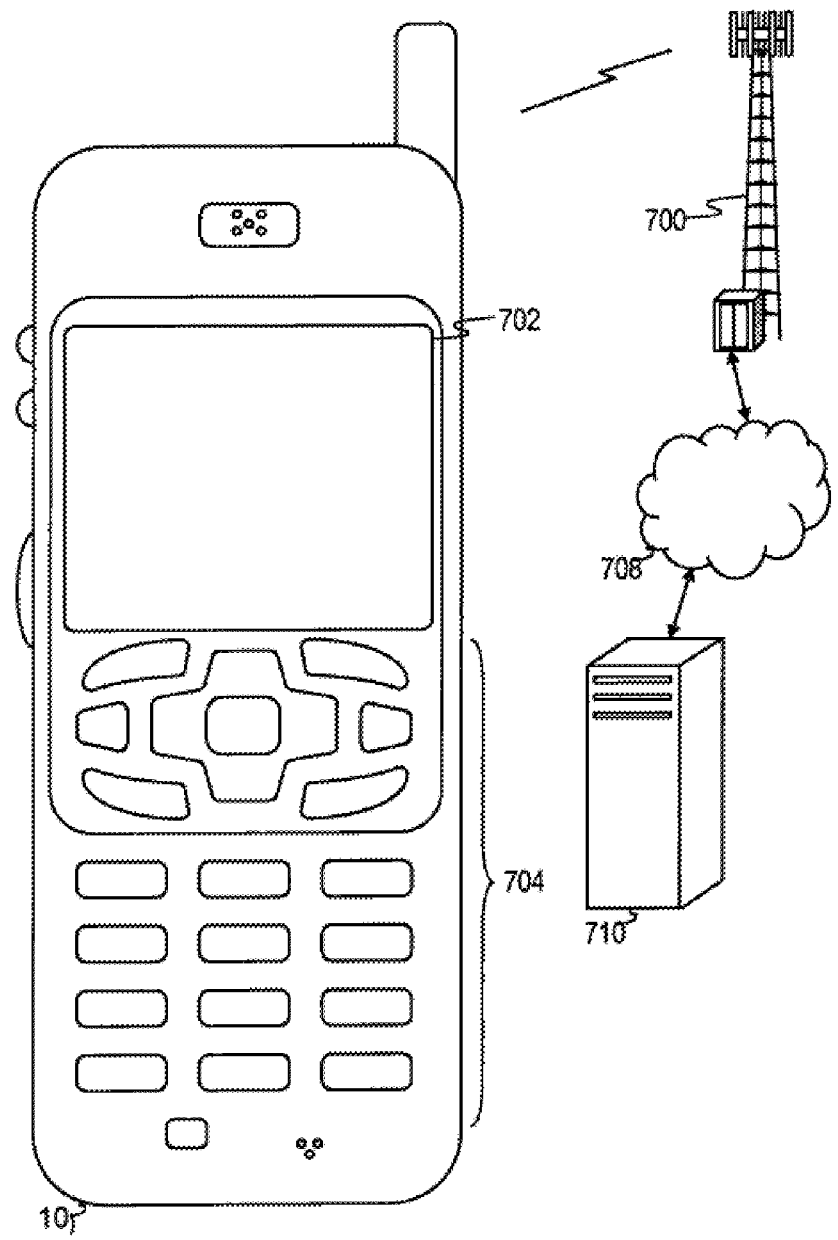
FIG. 4 is a diagram of a wireless communications system including a UA operable for some of the various example embodiments of the disclosure.

FIG. 4 illustrates a wireless communications system including an embodiment of UA 10. UA 10 is operable for implementing aspects of the disclosure, but the disclosure should not be limited to these implementations. Though illustrated as a mobile phone, the UA 10 may take various forms including a wireless handset, a pager, a personal digital assistant (PDA), a portable computer, a tablet computer, a laptop computer. Many suitable devices combine some or all of these functions. In some examples of the disclosure, the UA 10 is not a general purpose computing device like a portable, laptop or tablet computer, but rather is a special-purpose communications device such as a mobile phone, a wireless handset, a pager, a PDA, or a telecommunications device installed in a vehicle. The UA 10 may also be a device, include a device, or be included in a device that has similar capabilities but that is not transportable, such as a desktop computer, a set-top box, or a network node. The UA 10 may support specialized activities such as gaming, inventory control, job control, and/or task management functions, and so on.

The UA 10 includes a display 702. The UA 10 also includes a touch-sensitive surface, a keyboard or other input keys generally referred as 704 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UA 10 may present options for the user to select, controls for the user to actuate, and/or cursors or other indicators for the user to direct.

The UA 10 may further accept data entry from the user, including numbers to dial or various parameter values for configuring the operation of the UA 10. The UA 10 may further execute one or more software or firmware applications in response to user commands. These applications may configure the UA 10 to perform various customized functions in response to user interaction. Additionally, the UA 10 may be programmed and/or configured over-the-air, for example from a wireless base station, a wireless access point, or a peer UA 10.

Among the various applications executable by the UA 10 are a web browser, which enables the display 702 to show a web page. The web page may be obtained via wireless communications with a wireless network access node, a cell tower, a peer UA 10, or any other wireless communication network or system 700. The network 700 is coupled to a wired network 708, such as the Internet. Via the wireless link and the wired network, the UA 10 has access to information on various servers, such as a server 710. The server 710 may provide content that may be shown on the display 702. Alternately, the UA 10 may access the network 700 through a peer UA 10 acting as an intermediary, in a relay type or hop type of connection.

Figure 5:
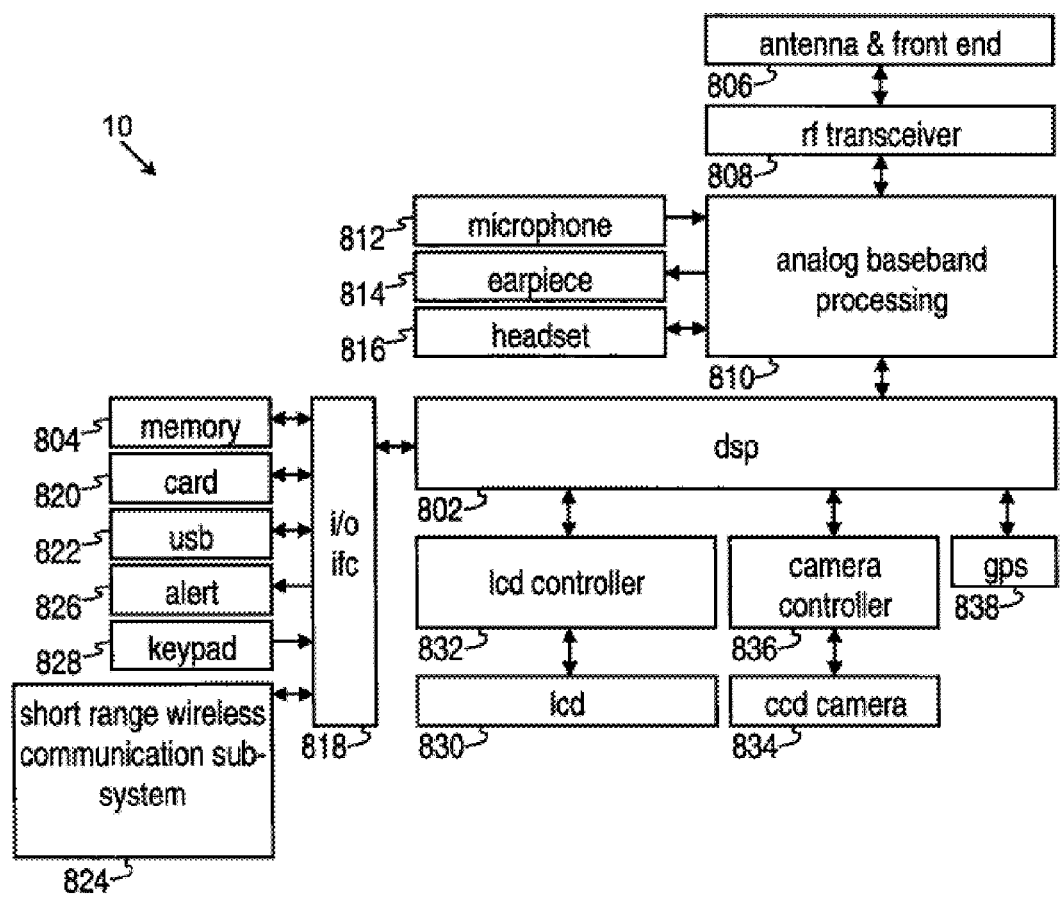
FIG. 5 is a block diagram of a UA operable for some of the various embodiments of the disclosure.

FIG. 5 shows a block diagram of the UA 10. While a variety of known components of UAs 110 are depicted, in an embodiment a subset of the listed components and/or additional components not listed may be included in the UA 10. The UA 10 includes a digital signal processor (DSP) 802 and a memory 804. As shown, the UA 10 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the UA 10 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the UA 10 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the UA 10 to send and receive information from a cellular network or some other available wireless communications network or from a peer UA 10. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF Transceiver 808, portions of the Antenna and Front End 806, and the analog base band processing unit 810 may be combined in one or more processing units and/or application specific integrated circuits (ASICs).

The analog base band processing unit 810 may provide various analog processing of inputs and outputs, for example analog processing of inputs from the microphone 812 and the headset 816 and outputs to the earpiece 814 and the headset 816. To that end, the analog base band processing unit 810 may have ports for connecting to the built-in microphone 812 and the earpiece speaker 814 that enable the UA 10 to be used as a cell phone. The analog base band processing unit 810 may further include a port for connecting to a headset or other hands-free microphone and speaker configuration. The analog base band processing unit 810 may provide digital-to-analog conversion in one signal direction and analog-to-digital conversion in the opposing signal direction. In some embodiments, at least some of the functionality of the analog base band processing unit 810 may be provided by digital processing components, for example by the DSP 802 or by other central processing units.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the UA 10 and may also enable the UA 10 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the UA 10 to communicate wirelessly with other nearby mobile devices and/or wireless base stations.

The input/output interface 818 may further connect the DSP 802 to the alert 826 that, when triggered, causes the UA 10 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific pre-assigned melody for a particular caller.

The keypad 828 couples to the DSP 802 via the interface 818 to provide one mechanism for the user to make selections, enter information, and otherwise provide input to the UA 10. The keyboard 828 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the UA 10 to take digital pictures. The DSP 802 communicates with the CCD camera 834 via the camera controller 836. In another embodiment, a camera operating according to a technology other than Charge Coupled Device cameras may be employed. The GPS sensor 838 is coupled to the DSP 802 to decode global positioning system signals, thereby enabling the UA 10 to determine its position. Various other peripherals may also be included to provide additional functions, e.g., radio and television reception.

Figure 6:
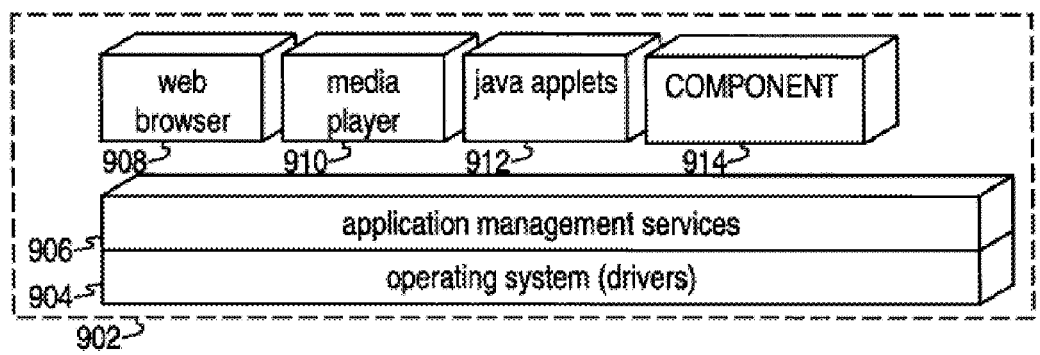
FIG. 6 is a diagram of a software environment that may be implemented on a UA operable for some of the various embodiments of the disclosure.

FIG. 6 illustrates a software environment 902 that may be implemented by the DSP 802. The DSP 802 executes operating system drivers 904 that provide a platform from which the rest of the software operates. The operating system drivers 904 provide drivers for the UA hardware with standardized interfaces that are accessible to application software. The operating system drivers 904 include application management services ("AMS") 906 that transfer control between applications running on the UA 10. Also shown in FIG. 6 are a web browser application 908, a media player application 910, and Java applets 912. The web browser application 908 configures the UA 10 to operate as a web browser, allowing a user to enter information into forms and select links to retrieve and view web pages. The media player application 910 configures the UA 10 to retrieve and play audio or audiovisual media. The Java applets 912 configure the UA 10 to provide games, utilities, and other functionality. A component 914 might provide functionality described herein.

Figure 7:
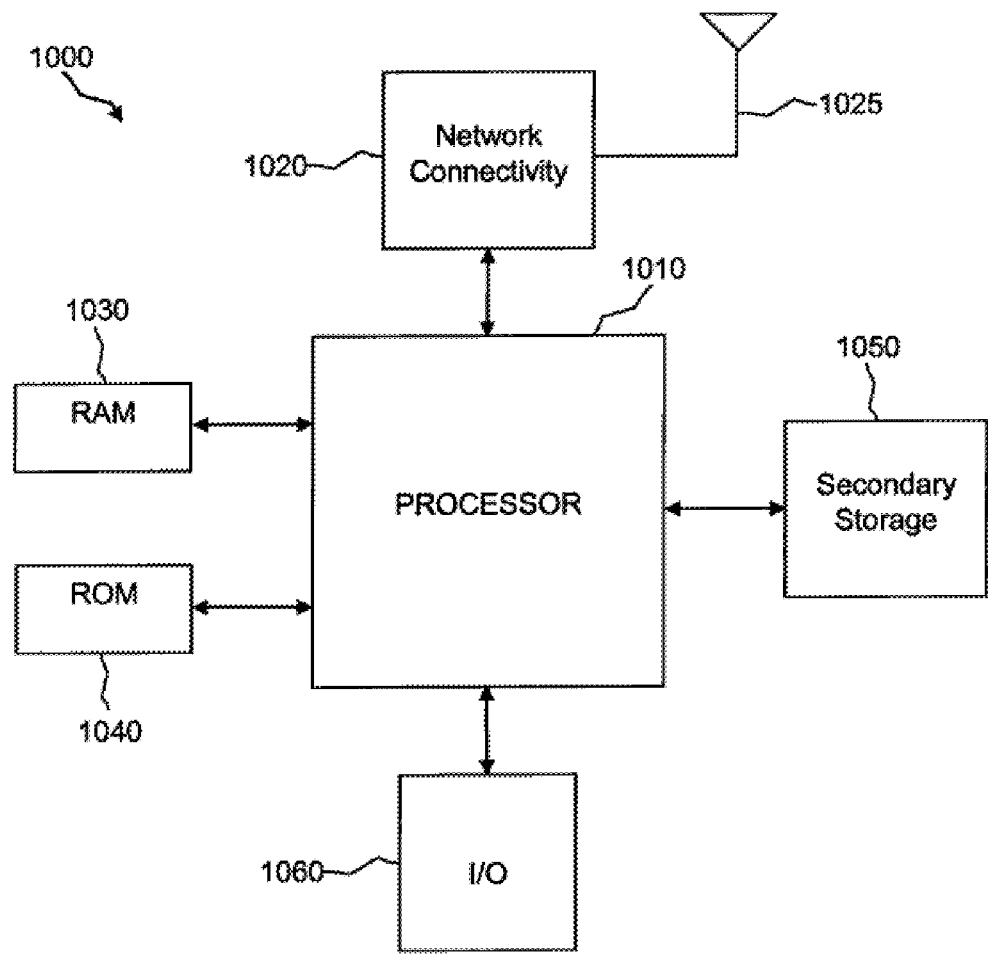
FIG. 7 is an illustrative general purpose computer system suitable for some of the various example embodiments of the disclosure.

The UA, the base station, and other components described above might include a processing component that is capable of executing instructions related to the actions described above. FIG. 7 illustrates an example of a system 1000 that includes a processing component 1010 suitable for implementing one or more embodiments disclosed herein. In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some cases, some of these components may not be present or may be combined in various combinations with one another or with other components not shown. These components might be located in a single physical entity or in more than one physical entity. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 might also include one or more transceiver components 1025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1025 might include separate receiving and transmitting units or a single transceiver. Information transmitted or received by the transceiver 1025 may include data that has been processed by the processor 1010 or instructions that are to be executed by processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. Secondary storage 1050 may be used to store programs that are loaded into RAM 1030 when such programs are selected for execution.

The I/O devices 1060 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the UA 10, such as the display 702 and the input 704.

The following 3rd Generation Partnership Project (3GPP) Technical Specifications (TS) are incorporated herein by reference:

3GPP TS 36.212, Technical Specification Group Radio Access Network, Evolved Universal Terrestrial Radio Access (EUTRA), Multiplexing and Channel Coding, V8.7.0 (2009-06) RP-090571, "Proposed Modifications to LTE feature group indications", Nokia Siemens Networks, Nokia Corporation, 3GPP TSG-RAN Plenary Meeting #44, Aruba, Netherland 3GPP TS 36.331, Technical Specification Group Radio Access Network, Evolved Universal Terrestrial Radio Access (EUTRA), Radio Resource Control, V8.6.0 (2009-06)

3GPP TS 36.211, Technical Specification Group Radio Access Network, Evolved Universal Terrestrial Radio Access (EUTRA), Physical Channels and Modulation, V8.7.0 (2009-06)

3GPP TS 36.213, Technical Specification Group Radio Access Network, Evolved Universal Terrestrial Radio Access (EUTRA), Physical Layer Procedures, V8.7.0 (2009-06)

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

The foregoing has described various processes and functionality that may be implemented using, for example, computer readable instructions. The example processes and functionality may be performed using one or more processors, controllers, and/or any other suitable processing devices. For example, the example processes and functionality may be implemented using coded instructions (e.g., computer readable instructions) stored on one or more tangible computer readable media such as memory, read-only memory (ROM), and/or random-access memory (RAM). As used herein, the term tangible computer readable medium is expressly defined to include any type of computer readable storage and to exclude propagating signals. Additionally or alternatively, the example processes and functionality may be implemented using coded instructions (e.g., computer readable instructions) stored on one or more non-transitory computer readable media such as flash memory, read-only memory (ROM), random-access memory (RAM), cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes and functionality may be implemented using any combination(s) of logic, such as application specific integrated circuit(s) (ASIC(s)), programmable logic device(s) (PLD(s)), field programmable logic device(s) (FPLD(s)), discrete logic, hardware, firmware, etc. Also, some or all of the example processes and functionality may be implemented manually or as any combination(s) of any of the foregoing techniques, for example, any combination of firmware, software, discrete logic and/or hardware. Further, although the example processes and functionality are described with reference to the drawings, other methods of implementing the processes and functionality may be employed.

Also, techniques, systems, subsystems, methods, functionality, and processes described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made without departing from the spirit and scope disclosed herein.

What is claimed is:

1. A method of establishing communication between user equipment and a network node comprising:
   receiving a common control channel message at user equipment;
   decoding the common control channel message at the user equipment using blind decoding;
   based on the blind decoding, determining a first number of antenna ports; and
   sending an indication from the user equipment of whether the user equipment is capable of receiving signals from a second number of antenna ports different than the first number of antenna ports.

2. The method of claim 1, wherein the common control channel message is encoded to indicate antenna capability of the network node.

3. The method of claim 2, wherein the common control channel message is sent using two antenna ports and the encoding indicates that the network is capable of using four transmit antenna ports.

4. The method of claim 1, further comprising receiving signaling through radio resource control that the network node is capable of using four transmit antenna ports.

5. The method of claim 1, wherein sending the indication of whether the user equipment is capable of receiving signals from the second number of antenna ports comprises sending the indication as part of a feature group indicator.

6. The method of claim 1, wherein if the indication specifies that the user equipment is capable of receiving signals from the second number of antenna ports, the second number of antenna ports are used for communication on control channels and the first number of antenna ports are used for communication on a user equipment-specific physical downlink shared channel.

7. The method of claim 1, further comprising grouping physical hybrid ARQ channels (PHICH) with a same antenna port configuration in a PHICH group.

8. The method of claim 1, further comprising grouping physical hybrid ARQ channels (PHICH) with different antenna port configurations in a PHICH group.

9. The method of claim 1, wherein if the indication specifies that the user equipment is capable of receiving signals from the second number of antenna ports, the second number of antenna ports are used for communication on common control channels and the first number of antenna ports are used for communication on user equipment-specific channels.

10. The method of claim 1, wherein if the indication specifies that the user equipment is not capable of receiving signals from the second number of antenna ports, a second number of antenna ports are used for communication on all channels.

11. The method of claim 1, wherein if the indication specifies that the user equipment is not capable of receiving signals from the second number of antenna ports, the first number of antenna ports are used for communication on control channels and a second number of antenna ports are used for communication on a user equipment-specific physical downlink shared channel.

12. The method of claim 1, wherein if the indication specifies that the user equipment is not capable of receiving signals from the second number of antenna ports, the first number of antenna ports are used for communication on common control channels and the first number of antenna ports and a second number of antenna ports are used for communication on a user equipment-specific physical downlink shared channel.

13. The method of claim 12, wherein the first number of antenna ports and the second number of antenna ports transmit using one of transmit diversity and spatial multiplexing.

14. The method of claim 1, wherein if the indication specifies that the user equipment is capable of receiving signals from the second number of antenna ports, the first number of antenna ports are used for communication on all channels.

15. A method as defined in claim 1, wherein the indication of whether the user equipment is capable of receiving signals from the second number of antenna ports comprises a one-bit indicator.

16. A method as defined in claim 1, wherein receiving the common control channel message comprises receiving the common control channel message on a physical broadcast channel (PBCH).

17. A method as defined in claim 1, further comprising:
   receiving a dedicated control channel message;
   decoding the dedicated control channel message; and
   based on the decoding, determining a second number of transmit antenna ports.

18. A method of establishing communication between user equipment and a network node comprising:
- encoding a common control channel message at a network node;
- sending the encoded common control channel message from the network node using a first number of antenna ports;
- receiving an indication at the network node of whether the user equipment is capable of receiving signals from a second number of antenna ports different than the first number of antenna ports; and
- sending a dedicated control channel message to update the antenna port information at the user equipment.

19. The method of claim 18, wherein the encoded common control channel message indicates antenna capability of the network.

20. The method of claim 19, wherein the encoded common control channel message is sent using two antenna ports and the encoding indicates that the network is capable of using four transmit antenna ports.

21. The method of claim 18, further comprising sending signaling through radio resource control that the network is capable of using four transmit antenna ports.

22. The method of claim 18, wherein receiving the indication of whether the user equipment is capable of receiving signals from the second number of antenna ports comprises receiving the indication as part of a feature group indicator.

23. The method of claim 18, wherein if the indication specifies that the user equipment is capable of receiving signals from the second number of antenna ports, the second number of antenna ports are used for communication on control channels and the first number of antenna ports are used for communication on a user equipment-specific physical downlink shared channel.

24. A method as defined in claim 18, wherein the indication of whether the user equipment is capable of receiving signals from the second number of antenna ports comprises a one-bit indicator.

25. A method in user equipment of establishing communication between user equipment and a network node comprising:
- receiving a common control channel message from the network node;
- decoding the common control channel message using blind decoding;
- determining a first number of transmit antenna ports used to transmit the common control channel message based on the blind decoding;
- sending an information element comprising an indication of capability of receiving signals from a second number of antenna ports, the second number of antenna ports being different than the first number of antenna ports; and
- receiving a dedicated control message including antenna port information.

* * * * *